Jan. 12, 1926.　　　　　　　　　　　　　　　　1,569,373
H. D. JAMES
CONTROL SYSTEM
Filed Nov. 20, 1920
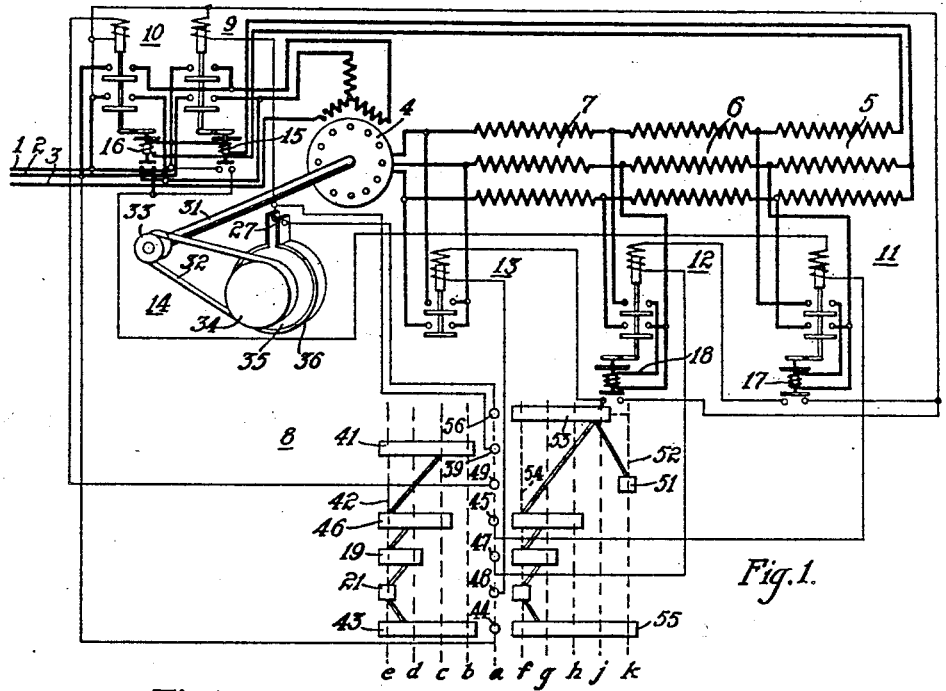
Fig.1.
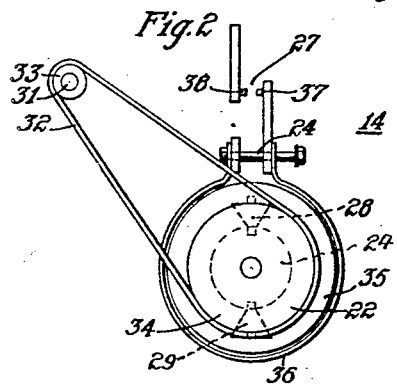
Fig.2.
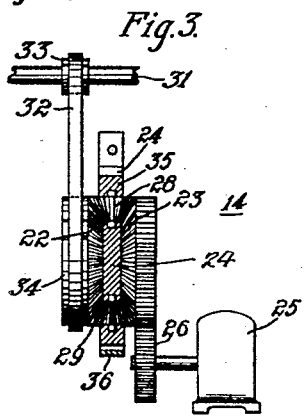
Fig.3.
Fig.4.
| | Hoist | | | | off | Lower | | | | |
|---|---|---|---|---|---|---|---|---|---|---|
| | e | d | c | b | a | f | g | h | j | k |
| 9 | ○ | ○ | ○ | ○ | | ○ | ○ | ○ | ○ | |
| 10 | | | | | | | | | | ○ |
| 11 | ○ | ○ | ○ | | | ○ | ○ | ○ | | |
| 12 | ○ | ○ | | | | ○ | ○ | | | |
| 13 | ○ | | | | | ○ | | | | |
WITNESSES:
H.J.Shelhamer
H.L.Godfrey
INVENTOR
Henry D. James
BY
Wesley G. Carr
ATTORNEY Patented Jan. 12, 1926.

1,569,373

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed November 20, 1920. Serial No. 425,457.

*To all whom it may concern:*

Be it known that I, HENRY D. JAMES, a citizen of the United States, and a resident of Edgewood Park, in the county of Allegheny and State of Pennsylvania, have invented a new and useful Improvement in Control Systems, of which the following is a specification.

My invention relates to systems of control and it has particular relation to hoist-control systems.

The object of my invention is to provide a novel and advantageous system of control for the dynamic braking of an alternating-current motor that is used in connection with hoist installations.

The present practice in hoist-control systems, when starting to lower a load, is to actuate the controller to a so-called "kick off" or "power notch." This "power notch" connects the motor to a source of energy in a direction tending to lower the load.

If the load is sufficient to drive the motor as a generator, the speed may be controlled by reversing the electrical connections to the motor. This is accomplished in my invention by actuating the controller from the so-called "power notch" to one of several operative positions in which the motor is connected for operation in a hoisting direction.

The difficulty of the present systems lies in the reverse connections to the motor; that is, the motor connections between the so-called "power notch" and the inoperative position of the controller. The motor connections are such that the motor is connected for operation in a hoisting direction. With the controller in one of the above-mentioned operative positions, if it is not quickly brought to the off position when the motor approaches zero speed, there is danger of the motor passing through zero speed and starting up in the hoisting direction.

According to my invention, I effect the disconnection of the motor, prior to passing through zero speed, by means of a differential-gear device such as that disclosed by S. A. Staege in his patent application Serial No. 297,297 filed May 15, 1919 and assigned to the Westinghouse Electric & Manufacturing Company.

My invention may best be understood by reference to the accompanying drawings, in which Figure 1 is a diagrammatic view of circuits and apparatus embodying my invention;

Fig. 2 is a side elevational view of a differential-reduction-gear mechanism that is employed in my invention;

Fig. 3 is a front elevational view of the arrangement shown in Fig. 2; and

Fig. 4 is a sequence chart, of well-known form, for indicating the operation of the system illustrated in Figure 1.

Referring particularly to Figure 1, the system shown comprises a source of polyphase energy 1, 2 and 3, an induction motor 4, a plurality of resistor groups 5, 6 and 7 that are connected to the rotor circuit of motor 4. A controller 8 effects the operation of reversing contactors 9 and 10 and accelerating contactors 11, 12 and 13. The system comprises, also, a differential-reduction-gear mechanism 14.

The contactors 9 and 10 connect the motor for operation in the forward and the reverse direction, respectively. Contactors 11, 12 and 13 successively shunt resistor groups 5, 6 and 7. The accelerating relays 15, 16, 17 and 18, which are of the series lock-out type, are operatively connected to their respective contactors by any means well known in the art.

The controller development shown may be that of a controller of either the drum or the cam type, preferably the latter. The lines designated by the letters represent successive operative positions of the controller. The lengths of the movable contact segments, for example, 19 and 21, indicate the operative positions in which the corresponding contactors are closed. The spaces between the pairs of contact segments indicate the operative positions in which the corresponding contactors are opened.

In Figs. 2 and 3 of the drawing are shown the details of construction of a differential-reduction-gear mechanism that is embodied in my invention. The reduction-gear mechanism shown comprises a gear member 22 that is operatively connected to the motor 4, and a gear member 23 that is operatively connected to a driving motor 25 through a gear wheel 26.

The central member 24 is rotated at a speed and in a direction determined by the relative rotation of the gear members 22 and 23 for selectively operating a switch 27. The end gear member 22 is provided with a portion having bevel-gear teeth for engaging the bevel pinions 28 and 29, which are pivotally mounted on the central member 24.

The reduction-gear mechanism 14 is operatively connected to the driving motor 4 in any suitable manner, for example, by means of a shaft 31, a belt 32, a pulley wheel 33 and a portion 34 of the gear member 22.

The gear member 23 is provided with bevel-gear teeth for engaging bevel pinions 28 and 29 and spur-gear teeth for engaging gear-wheel 26.

The central member 24 comprises a portion 35 which is rotatably mounted on the pinions 28 and 29. A frictional band member 36, that is adjustably mounted on the central member 24, actuates a movable contact member 37 of the switch 27 into engagement with a stationary contact member 38 to control the operation of the motor 4.

The mode of operation is as follows:

Position a of the controller development corresponds to an inoperative position of the motor. To connect the motor for hoisting, the controller drum is actuated successively through positions a, b, c, d and e. To connect the motor for lowering, the controller drum is actuated from position a to position k, which corresponds to the so-called "kick-off" or "power notch."

During the movement of the controller drum from position a to position k, the operation of switch 10 is prevented by any electrical or mechanical means well-known to the art; for example, by the type of controller illustrated. With the actuation of the controller from position k to position a, a braking force is exerted by the motor 4, the braking action being proportional to the resistance in the rotor circuit of motor 4.

The sequence of operations, for the hoisting portion of the cycle, is as follows:

With a movement of the controller drum from position a to position b, a circuit is established which extends from conductor 1 through the actuating coil of contactor 9, stationary contact member 39, movable contact member 41, conductor 42, movable contact member 43 and stationary contact member 44 to conductor 2. Contactor 9 is then closed to connect the motor 4 directly to the source of energy 1, 2 and 3.

When contactor 9 closes a force is exerted by the contactor on the accelerating relay 15 which tends to close the relay. During the first surge of current through the motor 4, this force is resisted by the magnetic force of the actuating coil of the relay 15. With a fall of the current through the motor to a predetermined value, the magnetic force decreases to such an extent that the relay 15 closes. The closing of relay 15 permits the operation of contactor 11, upon a further movement of the controller drum from position b to position c.

The circuits described in connection with the drum position b remain uninterrupted during the successive movements of the controller drum through positions c, d and e.

Upon the further actuation of the controller drum to position c, a circuit is completed which extends from conductor 1 through accelerating relay 15, actuating winding of contactor 11, stationary contact member 45, movable contact member 46, conductor 42, movable contact member 43 and stationary contact member 44 to conductor 2.

Contactor 11 then closes to shunt the accelerating resistor group 5. When the current in the secondary winding of the motor 4 has fallen to a predetermined value, the accelerating relay 17 closes to permit the operation of contactor 12, upon the operation of the controller drum to position d. The effect of shunting the resistor group 5 is to accelerate the motor to a certain degree. This circuit remains uninterrupted during the successive movements of the controller through positions d and e.

Upon such movement of the controller drum to position d, a circuit is completed which extends from conductor 1 through the accelerating relay 17, the actuating coil of contactor 12, stationary contact member 47, movable contact member 19, conductor 42, movable contact member 43 and stationary contact member 44 to conductor 2. Contactor 12 then closes to shunt the accelerating resistor group 6, at the same time, causing the accelerating relay 18 to become effective upon the current through its actuating winding falling to a predetermined value. The effect of shunting the resistor group 6 is to further accelerate the motor 4. This circuit remains uninterrupted with a movement of the controller to position e.

Upon further movement of the controller drum to position e, a circuit is completed, upon the operation of relay 18, which extends from conductor 1 through relay 18, actuating winding of contactor 13, stationary contact member 48, movable contact member 21, conductor 42, movable contact member 43 and stationary contact member 44 to conductor 2. Contactor 13 then closes to shunt the accelerating resistor group 7. With the shunting of the resistor group 7, a further acceleration of the motor 4 is effected. Position e corresponds to the final hoisting position of the controller for the controller development shown.

To effect the lowering of the hoist, the controller drum is first moved through the positions $a$, $f$, $g$, $h$ and $j$, to the so-called "kick-off" or "power notch," $k$.

As hereinbefore stated, during the movement of the controller drum from position $a$ to position $k$, the inoperative condition of switch 10 may be maintained by any mechanical or electrical means well-known to the art. With the controller in position $k$, a circuit is completed which extends from conductor 1 though the actuating winding of contactor 10, stationary contact member 49, movable contact member 51, conductor 52, movable contact member 53, conductor 54, movable contact member 55 and stationary contact member 44 to conductor 2.

Contactor 10 then closes to effect the operation of the motor in the direction opposite to that of hoisting. In order to simplify my drawing, I have shown only one position $k$ in which the motor is connected for reverse operation or lowering.

Upon a movement of the controller drum to position $j$, the movable contact member 51 is actuated out of engagement with stationary contact member 49 to open the actuating circuit of the contactor 10. With the controller in this position, a circuit is completed which extends from conductor 1 through the actuating winding of contactor 9, switch 27 of the differential-reduction-gear mechanism 14, stationary contact member 56, movable contact member 53, conductor 54, movable contact member 55 and stationary contact member 44 to conductor 2.

Contactor 9 then closes to connect the motor for operation in the hoisting direction. If the sum of the opposing torques exerted by the motor and the usual counterweight is less than that exerted by the hoist, the hoist continues to fall and the motor is operated in a direction opposite to that corresponding to the connections. The torque exerted by the motor is successively reduced through the remaining operative positions $h$, $g$ and $f$ by shunting the accelerating resistor groups 5, 6 and 7.

The cycle of operations for the remaining drum positions $h$, $g$ and $f$ is similar to that described for the hoisting positions $c$, $d$ and $e$.

For a further movement of the controller drum from position $f$ to position $a$, the circuit of the actuating winding of contactor 9 is interrupted to effect the disconnection of motor 4.

During the movement of the controller through the drum positions, $j$, $h$, $g$ and $f$, the load on the motor may vary to such an extent that the motor will pass through zero speed and start up in the hoisting direction.

This difficulty is removed in my invention by the introduction of a differential-reduction-gear mechanism for effecting the disconnection of the motor through the operation of the switch 27. This switch is so arranged that when the speed of the motor 4 falls below a predetermined value, the differential-reduction-gear mechanism effects the opening of the switch. This action in detail may be described as follows: As long as the speed of the main motor 4 exceeds the preselected speed of the auxiliary motor 25, the central member 24, by virtue of the intermeshing of the pinions 28 and 29 with the gear members 22 and 23, rotates in a direction corresponding to the closure of the switch 27. During this period, the outer ring 35 of the central member 24 slides within the frictional band 36. However, the instant that the main motor speed falls below that of the auxiliary motor, the rotative movement of the central member 24 in the reversed direction causes the friction band 36 to move clockwise, as viewed in Fig. 2, to effect the opening of the switch 27. The speed to which the motor 4 may fall before the operation of the switch 27 is controlled by varying the speed of the driving motor 25.

One advantage of my system of control lies in the provision of means for preventing the motor from passing through zero speed and into a hoisting direction during that portion of a cycle in which a hoist is being lowered.

While I have described a particular form of governor in the control system embodying my invention, it is apparent that various other forms having the same operating characteristics may be employed without departing from the spirit and scope of my invention. I desire therefore, that only such limitations shall be imposed thereon as are indicated in the appended claims.

I claim as my invention:

1. In a motor-control system, the combination with a motor, a load and a controller, of means comprising a differential gear mechanism responsive to said load for insuring said motor against operation in the reverse direction when said controller occupies a position corresponding to reversed motor operation.

2. In a motor-control system, the combination with a motor, a load at times adapted to be driven thereby and a controller for reversing the direction of current supplied to said motor, of differentially operable means for insuring against operation of said motor in the direction corresponding to that of the current, after overhauling said load.

3. In a motor-control system, the combination with a motor, a load at times adapted to be driven thereby and a controller having a plurality of operative positions to control the direction of said motor, of differential gear means operable, when the motor rotates in one direction driven by said load to prevent the operation of said motor in the reverse direction when the controller is adjusted to an operative position corresponding to reverse operation, and an auxiliary driving motor for controlling said differential means.

4. In a hoisting-control system, the combination with a driving motor therefor and a load, of a controller having a plurality of hoisting positions and a lowering position in which said motor is connected for rotation in the corresponding direction to be driven by said load, and means comprising a differential-reduction-gear mechanism for insuring against operation of the motor in the hoisting direction when the controller is in one of said hoisting positions and the motor is connected for hoisting.

5. In a system of control, the combination with a motor, of braking means comprising a load for said motor, means comprising a differential-gear mechanism whereby said motor when driven by said load is connected for operation in a direction tending to reverse it, and means responsive to the speed of said motor for preventing the operation of said motor in the reverse direction.

6. In a system of control, the combination with a motor and a controller, of a system of braking in which said motor is connected to a source of energy tending to rotate said motor in a direction opposite to the actual direction of rotation of the motor, and means responsive to the speed of said motor for preventing the operation of said motor in the reverse direction, said means comprising a differential-reduction-gear mechanism.

7. The combination with a motor and controlling means therefor, of speed-responsive means for actuating the motor-controlling means to stop said motor, and electroresponsive means for co-operating with said speed responsive means for rendering said controlling means ineffective after stopping.

8. The combination with a motor and controlling means therefor, of speed-responsive means for actuating the motor-controlling means to stop said motor, and electroresponsive means comprising a second motor for co-operating with said speed responsive means for rendering said controlling means ineffective after stopping.

In testimony whereof, I have hereunto subscribed my name this 4th day of November 1920.

HENRY D. JAMES.